United States Patent Office 3,544,610
Patented Dec. 1, 1970

3,544,610
PHENOXY- AND SUBSTITUTED PHENOXY-
PHENOXARSINE COMPOUNDS
Chun-Shan Wang and Thomas W. McGee, Midland, Mich., assignors to The Dow Chemical Company, Midland, Mich., a corporation of Delaware
No Drawing. Filed Jan. 23, 1969, Ser. No. 793,601
Int. Cl. C07d 105/06
U.S. Cl. 260—440        8 Claims

ABSTRACT OF THE DISCLOSURE 10-phenoxyphenoxarsine, 10 - (halophenoxy)phenoxarsines and 10-(alkylphenoxy)phenoxarsines are disclosed as novel compounds useful as herbicides, insecticides, fungicides and stabilizer additives for polyvinyl chloride resins.

SUMMARY OF THE INVENTION

The present invention is concerned with new and useful phenoxyphenoxarsine compounds and is particularly directed to halo- and alkyl-substituted phenoxyphenoxarsine compounds corresponding to the formula

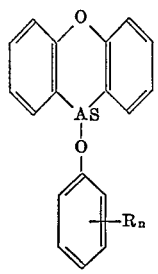

wherein R is halogen or alkyl and $n$ is the integer 0 to 5, inclusive. In the present specification and claims, the term "alkyl" is employed to designate straight and branched chain alkyl radicals containing 5, 6, 7, 8 and up to 9 carbon atoms, inclusive, and from 5, to 6, to 7, to 8, to 9 carbon atoms, inclusive. Halogen as used herein includes fluorine, chlorine, bromine and iodine.

The products of the present invention are normally white crystalline solids soluble in various organic solvents and of low solubility in water. The novel products are useful as herbicides, insecticides, fungicides and stabilizer additives for polyvinyl chloride.

The compounds of the invention may be prepared by reacting 10,10'-oxybisphenoxarsine with phenol or substituted phenols such, for example as p-chlorophenol, 2,4-dichlorophenol, 2,4,6-trichlorophenol, 2,3,4,6-tetrachlorophenol, 2,3,4,5,6-pentachlorophenol, 2,4-difluorophenol, 2,4,6-tribromophenol, 2,3,4,6 - tetraiodophenol, p - nonylphenol, p-sec-amylphenol, p-heptylphenol, p-octylphenol, p-hexylphenol and the like. The reaction of the oxybisphenoxarsine reactant and the phenolic compound reactant conveniently is carried out in the presence of an inert water-immiscible liquid reaction medium. Use of the inert liquid carrier is not critical but it is preferred since it provides for better dispersion and contacting of the reactants. Representative suitable inert liquids include, for example, hydrocarbons of the benzene series such as benzene, toluene and xylene. Preferably, benzene is employed as the inert liquid reaction medium.

The reaction of the oxybisphenoxarsine reactant and the phenolic compound reactant is carried out at a temperature range of from about 80° to about 250° C. and is preferably conducted at about 90° C. The reaction goes forward under pressures of a wide range; however, no particular advantage ordinarily results from the use of subatmospheric or superatmospheric pressures, and therefore the preparation is ordinarily carried out at atmospheric pressure.

The amounts of the reactants to be employed are not critical, some of any of the desired products being formed when employing these in any proportions. However, the reaction consumes the reactants in the proportion of one mole of 10,10'-oxybisphenoxarsine to two moles of phenol or substituted phenol. A suitable range for the ratio of reactants is 1:2 to 1:5 (10,10'-oxybisphenoxarsine:phenol material) and the employment of a 1:2 mole ratio of these reactants is preferred.

The reaction mixture ordinarily is refluxed in the presence of an inert liquid reaction medium in a refluxing apparatus containing a trap, e.g., a Dean-Stark trap, to azeotrope off the water of formation. Ordinarily the reactants are refluxed for a period of from about 2 to about 48 hours, and preferably, to obtain optimum yields, from about 8 to about 16 hours. The phenoxyphenoxarsine product can be recovered from the product mass and the separated product can be employed directly for the useful purposes of the present invention. If desired, the product can be further purified by conventional procedures before being so employed. Representative purification procedures include washing with an appropriate liquid which is a solvent for impurities but not for the product, recrystallization and the like.

DESCRIPTION OF THE PREFERRED
EMBODIMENTS

The following examples illustrate the present invention but are not to be construed as limiting the same.

Example 1.—10-phenoxyphenoxarsine 10,10'-oxybisphenoxarsine (25.1 grams; 0.05 mole) and phenol (9.5 grams; 0.1 mole) are mixed together in 300 milliliters of thiophene-free benzene at room temperature to prepare a reaction mixture. The reaction mixture is refluxed for twenty-four hours in a round-bottom flask equipped with a stirrer, reflux condenser and Dean-Stark trap to azeotrope off the water of formation. The benzene solution is filtered and the filtrate is concentrated to 50 milliliters on a rotary evaporator. Nitromethane (50 milliliters) is added to this filtrate and the resulting solution is allowed to stand at room temperature overnight. A white crystalline solid, mostly 10,10'-oxybisphenoxarsine, which precipitates from the solution is removed by subsequent filtration. The filtrate, upon standing in a cool place for two to three days, gives 13 grams (40 percent yield) of the desired 10-phenoxyphenoxarsine product as a white crystalline solid melting at from 95°–98° C. The infrared spectrum of the crystalline solid supports the proposed structure. Elemental analysis showed: C, 63.8 percent; H, 3.93 percent; calculated for $C_{18}H_{13}AsO_2$: C, 64.29 percent; H, 3.87 percent.

Example 2.—10-(p-chlorophenoxy)phenoxarsine

By following the procedural steps of Example 1, 10-(p-chlorophenoxy)phenoxarsine is obtained by reacting together 10,10'-oxybisphenoxarsine and p-chlorophenol. The crude solid is purified by fractional sublimation at about 5 millimeters pressure. Unreacted p-chlorophenol sublimes at around 60°–80° C. and the desired product at 100° C. The product of reaction is a white crystalline solid melting at from 85°–86° C. The IR spectrum supports the proposed structure and indicates that the material is 99+ percent pure. Elemental analysis showed: C, 58.3 percent; H, 3.35 percent; Cl, 9.7 percent; calculated for $C_{18}H_{12}AsClO_2$: C, 58.29 percent; H, 3.24 percent; Cl, 9.58 percent.

Example 3.—10-(2,4-dichlorophenoxy)phenoxarsine

By following the procedural steps of Example 2, 10-(2,4-dichlorophenoxy)phenoxarsine is obtained by reacting together 10,10'-oxybisphenoxarsine and 2,4-dichlorophenol. The desired product is obtained by sublimation as a white crystalline solid melting at from 98°–100° C. Elemental analysis showed: C, 53.9 percent; H, 2.71 percent; Cl, 17.3 percent; calculated for $C_{18}H_{11}AsCl_2O_2$: C, 53.33 percent; H, 2.72 percent; Cl, 17.53 percent. The IR spectrum indicates that this compound is 95 percent pure.

Example 4.—10-(2,4,6-trichlorophenoxy)phenoxarsine

By following the procedural steps of Example 2, 10-(2,4,6-trichlorophenoxy)phenoxarsine is obtained by reacting together 10,10'-oxybisphenoxarsine and 2,4,6-trichlorophenol. The desired product is obtained by sublimation as a white crystalline solid melting at from 150°–155° C. The infrared spectrum of the compound supports the proposed structure.

Example 5.—10-(2,3,4,6-tetrachlorophenoxy)phenoxarsine

By following the procedural steps of Example 2, 10-(2,3,4,6-tetrachlorophenoxy)phenoxarsine is obtained by reacting together 10,10'-oxybisphenoxarsine and 2,3,4,6-tetrachlorophenol. The desired product is obtained by sublimation as a white crystalline solid melting at from 135°–140° C. The IR spectrum supports the structure of the compound.

Example 6.—10-(pentachlorophenoxy)phenoxarsine

By following the procedural steps of Example 1, 10-(pentachlorophenoxy)phenoxarsine is obtained by reacting together 10,10'-oxybisphenoxarsine and pentachlorophenol. The crude product is recrystallized twice from nitromethane to give a white crystalline solid melting at from 134°–139° C. The infrared spectrum of the compound supports the proposed structure.

Example 7.—10-(p-nonylphenoxy)phenoxarsine 10,10'-oxybisphenoxarsine (25.1 grams; 0.05 mole) and p-nonylphenol (22.0 grams; 0.1 mole) are mixed together in 300 milliliters of thiophene-free benzene to prepare a reaction mixture. The mixture is refluxed with vigorous stirring for twenty-four hours in a round-bottom flask equipped with a Dean-Stark trap to azeotrope off the water of reaction. The water is removed and the resulting solution is filtered hot. This filtrate shows, by mass spectral analysis, the presence of 10-(p-nonylphenoxy)phenoxarsine. The filtrate is then concentrated to dryness on a rotary evaporator, leaving a residual brown mass. The desired product is purified by fractional sublimation under 4 millimeters mercury pressure absolute. Unreacted nonylphenol sublimes at 60°–80° C. At a temperature of 150° C., a white solid starts to coat the condenser. Mass spectral analysis indicates the crystalline solid is the desired 10-(p-nonylphenoxy)phenoxarsine product melting at from 187°–189° C., with a molecular weight of 462.

In view of the foregoing teachings and examples, those skilled in the art will be enabled to prepare all of the products of the present invention. Other representative products are set forth in the following examples:

10,10'-oxybisphenoxarsine is reacted with p-sec-amylphenol to provide 10-(2,4,6-triiodophenoxy)-phenoxarsine having a molecular weight of 406.35.

10,10'-oxybisphenoxarsine is reacted with p-heptylphenol to provide 10-(p-heptylphenoxy)phenoxarsine having a molecular weight of 434.4.

10,10'-oxybisphenoxarsine is reacted with 2,4-difluorophenol to provide 10-(2,4,6-triiodophenoxy)-phenoxarsine having a molecular weight of 713.9.

10,10'-oxybisphenoxarsine is reacted with 2,4,6-tribromophenol to provide 10-(2,4,6-tribromophenoxy)-phenoxarsine having a molecular weight of 571.9.

10,10'-oxybisphenoxarsine is reacted with 2,4,6-triiodophenol to provide 10(2,4,6-triiodophenoxy)-phenoxarsine having a molecular weight of 713.9.

The products of the present invention are useful as pesticides for the control of a wide variety of fungal, bacterial and insect pests such as *Bacillus subtilis, Aspergillus tereus, Staphylococcus aureus*, southern army worm and yellow fever mosquito. The 10-(chlorophenoxy)-derivatives are found to exhibit outstanding herbicidal activity on submersed and floating aquatic plants. For any of these uses, the unmodified compounds can be employed. Alternatively, the compounds can be dispersed on an inert finely divided solid to prepare dust compositions. The latter dust compositions can be dispersed in water with or without the aid of a wetting agent and the resulting aqueous dispersions employed as sprays. In other procedures, the compounds can be employed as a constituent in edible oils or in other oils or solvents, or as a constituent in solvent-in-water or water-in-solvent emulsions or dispersions which can be employed as sprays, drenches or washes. Good results are obtained with methods employing and compositions containing pesticidal amounts of one or more of the compounds hereof. Generally, these amounts range from about 1 to about 500 parts per million of one or more of the compounds.

In representative operations, each of 10-phenoxyphenoxarsine and 10-(chloro-substituted phenoxy)-phenoxarsines gives complete control and kill of the organisms, *Staphyloccocus areus, E. coli Candida albicans, Trichophyton mentagrophytes, Bacillus subtilis, Aerobacter aerogenes, Candida pelliculosa, Pullularia pullulans, Salmonella typhosa and Rhizopus nigricans*, when one of the named compounds is separately applied to the environments containing and supporting thriving members of one of such organisms at a concentration of 500 parts per million by weight.

In further representative operations, each of 10-phenoxyphenoxarsine and 10-(chloro-substituted phenoxy)-phenoxarsines gives substantially complete control and kill of yellow fever mosquitoes when such are contacted with aqueous compositions containing the named compounds at a concentration of 1 part per million by weight.

In additional operations, 10-(p-nonylphenoxy)-phenoxarsine can be used as a stabilizer additive in polyvinyl chloride systems. The compound, when incorporated into the polyvinyl chloride, has been shown to impart outstanding performance characteristics such as remarkable heat and light stability, exceptional permanence and highly effective antifungal and antibacterial properties.

Phenol, halophenols and alkyl substituted phenols are known compounds and can be prepared in accordance with known methods. The other starting material used in the synthesis of the phenoxyphenoxarsine compounds of this invention is 10,10'-oxybisphenoxarsine. This compound can be prepared readily in nearly quantitative yield from 10-chlorophenoxarsine and ammonium hydroxide in ethanol as represented by the following equation:

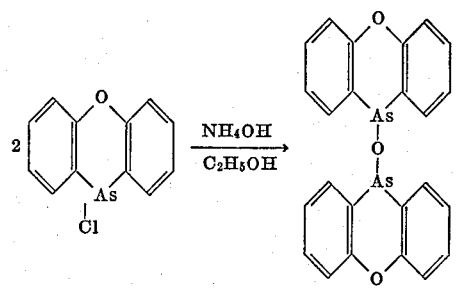

The desired compound is crystallized from aqueous ethanol. 10-chlorophenoxarsine is prepared from diphenyl ether, arsenic trichloride and a catalytic amount of aluminum chloride in the absence of a solvent.

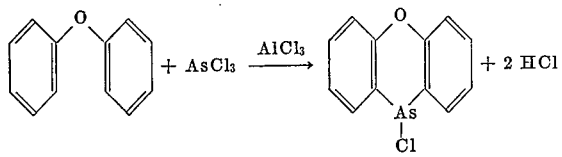

What is claimed is:
1. The compounds corresponding to the formula

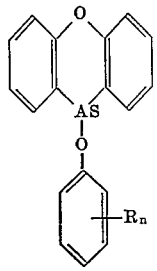

wherein R is selected from the group consisting of alkyl and halogen, said alkyl being a straight or branched chain saturated aliphatic hydrocarbon containing from 5 to 9 carbon atoms, inclusive, and $n$ is the integer 0 to 5, inclusive.

2. The compound claimed in claim 1 which is 10-phenoxyphenoxarsine.
3. The compound claimed in claim 1 which is 10-(p-chlorophenoxy)phenoxarsine.
4. The compound claimed in claim 1 which is 10-(2,4-dichlorophenoxy)phenoxarsine.
5. The compound claimed in claim 1 which is 10-(2,4,6-trichlorophenoxy)phenoxarsine.
6. The compound claimed in claim 1 which is 10-(2,3,4,6-tetrachlorophenoxy)phenoxarsine.
7. The compound claimed in claim 1 which is 10-(pentachlorophenoxy)phenoxarsine.
8. The compound claimed in claim 1 which is 10-(p-nonylphenoxy)phenoxarsine.

References Cited
UNITED STATES PATENTS

| | | | |
|---|---|---|---|
| 2,767,114 | 10/1956 | Urbschat et al. | 260—440 X |
| 3,036,107 | 5/1962 | Dunbar | 260—440 |
| 3,038,921 | 6/1962 | Strycker et al. | 260—440 |
| 3,149,133 | 9/1964 | Strycker | 260—440 X |
| 3,197,494 | 7/1965 | Strycker | 260—440 |
| 3,197,495 | 7/1965 | Strycker | 260—440 |

HELEN M. McCARTHY, Primary Examiner

W. F. W. BELLAMY, Assistant Examiner

U.S. Cl. X.R.

71—97; 260—45.75; 424—297

PO-1050
(5/69)

UNITED STATES PATENT OFFICE
CERTIFICATE OF CORRECTION

Patent No. 3,544,610          Dated  1 December 1970

Inventor(s)  Chun-Shan Wang and Thomas W. McGee

It is certified that error appears in the above-identified patent and that said Letters Patent are hereby corrected as shown below:

In column 3, line 67, delete "(2,4,6 triiodophenoxy)" and insert -- (p-sec-amylphenoxy) --; line 74 delete "(2,4,6-triiodophenoxy)" and insert -- (2,4-difluorophenoxy) --; line 75, delete "713.9" and insert -- 372.2 -- .

Signed and sealed this 18th day of May 1971.

(SEAL)
Attest:

EDWARD M. FLETCHER, JR.          WILLIAM E. SCHUYLER, JR.
Attesting Officer                Commissioner of Patents